ELECTRICAL APPARATUS

Filed Sept. 4, 1952 3 Sheets-Sheet 1

INVENTOR.
Sava Jacobson
BY Robert L Kahn
Atty.

May 4, 1954 S. JACOBSON 2,677,784
ELECTRICAL APPARATUS
Filed Sept. 4, 1952 3 Sheets-Sheet 2

INVENTOR.
Sava Jacobson
BY.
Robert L Kahn
Atty.

May 4, 1954 S. JACOBSON 2,677,784

ELECTRICAL APPARATUS

Filed Sept. 4, 1952 3 Sheets-Sheet 3

INVENTOR.
Sava Jacobson.
BY. Robert L Kahn
Atty.

Patented May 4, 1954

2,677,784

UNITED STATES PATENT OFFICE 2,677,784

ELECTRICAL APPARATUS

Sava Jacobson, Chicago, Ill., assignor to Edwin I. Guthman & Co., Inc., Chicago, Ill., a corporation of Illinois Application September 4, 1952, Serial No. 307,739

10 Claims. (Cl. 315—23)

This invention relates to an electrical apparatus, and more particularly to an improvement in the magnetic deflection yoke of a cathode ray tube. While the invention has general application to cathode ray tubes utilizing magnetic deflection, a desirable field for application of this invention resides in cathode ray tubes used in television receivers.

It is well known that cathode ray tubes beyond a certain size generally utilize magnetic deflection in order to keep the overall length of the tube within reasonable bounds. As a rule, each such cathode ray tube has a yoke carrying two windings. The two coils forming a winding are disposed opposite each other and cooperate to control one of the two sweeps. Thus in practice, one winding will control the vertical sweep of the cathode ray tube while another winding will control the horizontal sweep of the tube.

In normal receivers, the vertical sweep winding operates at comparatively low sweep frequencies and presents few problems. The horizontal sweep winding operates at much higher sweep frequencies, the usual ratio of horizontal to vertical being about 525 to 1. The high frequency at which a horizontal sweep magnetic winding operates necessitates consideration of capacitance to ground, distributed capacitance of the windings and resonance. These factors will vary from tube to tube and unless compensated for will have substantial random effects upon the satisfactory operation of the cathode ray tubes in television reception. With the advent of highly efficient horizontal sweep circuits requiring the use of windings having high inductance, the above factors have become more important.

The art has met this problem providing a capacitor across the high potential coil of the horizontal sweep winding. The capacitor has generally been fixed and, in practice, a fixed capacitor for average requirements has been used. In some instances, a fixed resistor in series with the capacitor has been used for the purpose of broadening the null point for balance capacitance.

As a rule, the tolerances on fixed capacitors are of the same order as differences between balancing capacitors required by particular yokes. Accordingly, it has been realized that the use of fixed capacitors in magnetic winding yokes for cathode ray tubes is inherently unsatisfactory and that instead a variable capacitor should be used. However, up to date, no satisfactory capacitor for this purpose has been provided.

While variable capacitor constructions are available for balancing yoke windings, such constructions are costly, apart from the problem of mounting and wiring. Because of the high frequencies involved and the low values of inductance and capacitance which are present, any variable capacitor used for balancing should be located close to the windings to be balanced. Furthermore, such variable capacitor has to be mechanically stable and be disposed in such manner as to make a minimum demand upon space, be readily available for adjustment and have a minimum effect upon existing design of parts and assembly.

In accordance with this invention there is provided a variable capacitor whose construction is simple and is incorporated within the general physical construction of a yoke for carrying the magnetic deflection windings of a cathode ray tube. The general physical construction of such a yoke, together with the general manner and method of assembling the yoke structure, is retained. A substantial feature of the invention resides in the fact that the yoke construction embodying the invention may be manufactured at substantially the same cost as conventional yokes while retaining the advantages imparted thereto in the way of a variable capacitor for balancing the winding.

For a more thorough understanding of the invention, reference will now be made to the drawings wherein an exemplary embodiment of the invention is illustrated. It is understood, however, that modifications may be made without departure from the spirit of the invention and that such modifications will readily occur to those skilled in the art, together with additional advantages. Referring, therefore, to the drawings.

Figure 1:
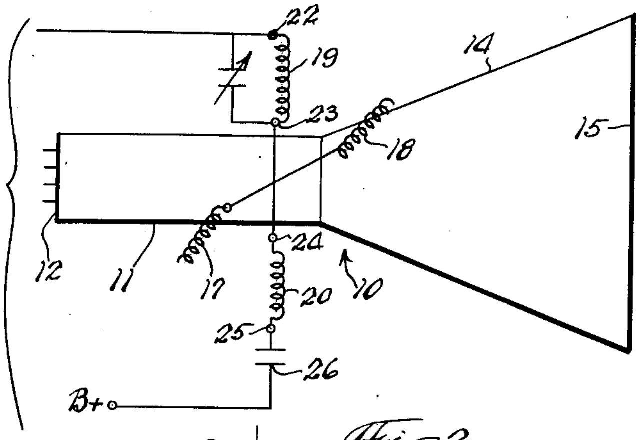
Figure 1 is a diagrammatic representation of a cathode ray tube provided with magnetic deflecting windings, the figure showing in diagrammatic form a variable capacitor applied to one of the windings.
Figure 2:
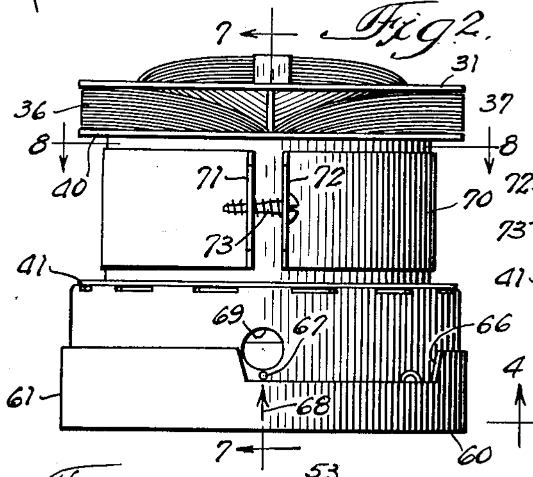
Figure 2 is an elevation of a magnetic deflection yoke and windings for cathode ray tube, said yoke embodying the present invention.
Figure 3:
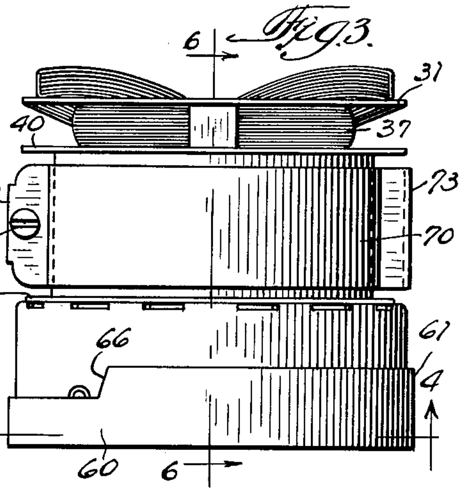
Figure 3 is an elevation similar to Figure 2 but at right angles thereto.

Referring first to Figure 1, there is shown a cathode ray tube generally indicated by numeral 10, this tube having a straight, generally cylindrical electron gun barrel 11, at one end of which is base 12 and at the other end of which is frustoconical portion 14, the latter being bounded by screen wall 15. Inasmuch as the details of the cathode ray tube form no part of the present invention, no further description thereof will be provided except that the interior is provided with the usual electrodes, consisting of cathode, various control electrodes, and the tube is provided with internal or external focusing means. Associated with the cathode ray tube are electromagnetic deflection windings for deflecting the electron stream in both horizontal and vertical directions. The horizotal and vertical directions are merely assumed for convenience and, in practice, the deflection axes may extend in any desired direction. The deflection axes are customarily at right angles. For convenience, coils 17 and 18 will be considered as the vertical sweep winding. Coils 19 and 20 form the horizontal sweep winding with which this invention is particularly concerned. As is well known, the two windings are properly shaped, as for example to provide cosine windings, and are to be described later. The vertical sweep coils 17 and 18 are connected in conventional manner in circuits. No details regarding the connections for these coils in circuits will be shown, although the terminals for these coils will be shown and described in other figures of the drawing.

Referring to the horizontal sweep coils 19 and 20, it will be observed that coil 19 has terminals 22 and 23 while coil 20 has terminals 24 and 25. Terminals 23 and 24 are connected together so that the coils are in series. Connected to terminal 25 of coil 20 is fixed capacitor 26. The horizontal sweep input is customarily fed to coil 19 and 20 and capacitor 26 in series. The usual B+ connection is provided. Most, if not all, of the coil terminals are at high potential. For sweep frequencies, B+ may be considered as ground.

Referring now to Figures 2 to 10 inclusive, the detailed mechanical construction of a magnetic deflection yoke embodying the present invention is disclosed and will be described. Suitably supported on insulating form 30 having flaring ends 31 and 32 are horizontal coils 34 and 35 and vertical sweep coils 36 and 37. The coils forming these windings are disposed with relation to insulating form 30 in a manner well known in the art, the very ends of the coils being lapped over along the flaring ends of the form. The form may have tongues for dividing the winding space. The various coils are maintained in assembled position by the use of cement and tape, the entire construction being sufficiently rigid for use on a cathode ray tube. It will be noted that the horizontal sweep winding is disposed closer to the inside of the yoke than the vertical sweep winding.

Disposed around the outside of form 30 is a powdered iron magnetic core generally indicated by numeral 39 and usually consisting of a number of curved pieces cemented together to form a ring. Flanges 40 and 41 of fiber or other insulating material are cemented or formed to lie along the sides of powdered iron core 39. For convenience, the side of the yoke where form side 31 is provided will be termed the front end of the yoke and the other end will be termed the rear end. As is usual, the front end of the yoke has the overlay of the windings somewhat greater than at the rear end, this being well known in the art. Cemented to rear flange 41 is insulating member 43, in the form of a ring, of fiber or any other rigid insulating material. Ring 43 is long enough axially of the yoke so that outer edge 44 of the ring is well beyond the ends of the windings. Thus an enclosed annular region within ring 43 and beyond the windings is provided.

Ring 43 has a number of terminals riveted thereto, generally along the arc of a circle, these terminals being adapted to function as terminals of the various windings and the variable capacitor to be described. In particular, ring 43 carries terminals 46 and 47 riveted or eyeletted thereto, these two terminals being separated by a suitable distance along the ring interior. The fastening means for holding terminals 46 and 47 also support a variable capacitor shown in detail in Figure 9.

Figures 8, 9, 10:
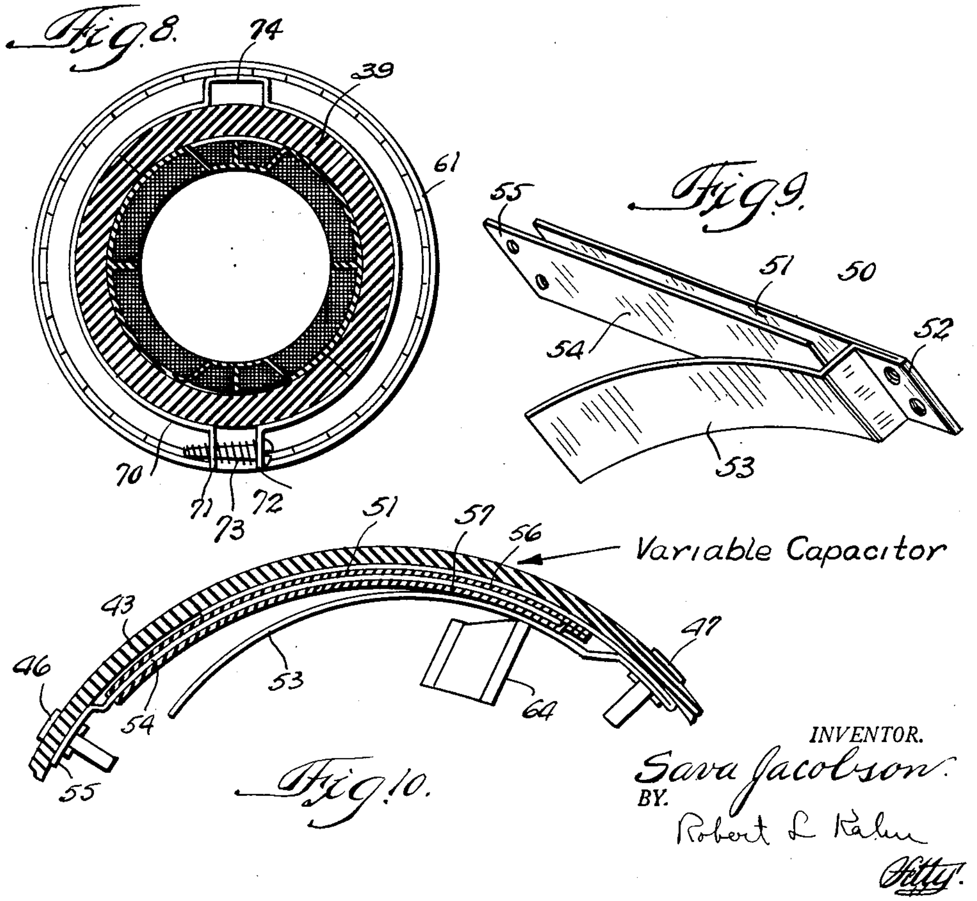
Figure 8 is a section along line 8—8 of Figure 2.
Figure 9 is a perspective detail of the variable capacitor used in the magnetic deflecting yoke embodying the present invention.
Figure 10 is a sectional detail of the mounting of the variable capacitor in the yoke proper, illustrating the manner in which the capacitor is supported.

Thus, referring to Figure 9, the variable capacitor, generally indicated by numeral 50, comprises one electrode 51 having anchor portion 52 attached to ring 43 at terminal 47. The capacitor electrodes are flexible and preferably of spring materials, such as copper or spring brass. Anchor portion 52 also carries movable plate 53, this plate being curved and tending to spring away from plate 51. Disposed between plates 51 and 53 is plate 54 having anchor portion 55 attached to insulating ring 43 at terminal 46. Suitable insulators 56 and 57 of flexible material, such as fiber or polyvinyl, polyethylene or nylon are disposed on the two sides of plate 54. Insulating plate 57 may be elastic and tend to push movable plate 53 away from plate 54.

If desired, the various capacitor plates may have an insulating coating of varnish or other material applied or sprayed thereto rather than have separate insulating sheets. In general, a condenser having a low Q (poor power factor) is desired to suppress oscillations. It is possible to omit plate 51 and merely depend upon plate 54 and movable plate 53 for obtaining desired capacitance variation. However, it is preferred to have some minimum capacitance upon which there may be superimposed some variable capacitance as shown. It is possible to provide additional fixed plates.

In order to vary the capacitance of the condenser illustrated in detail in Figure 9, insulating cap 60 is provided. This cap has flange 61 overlying the outside of part of insulating ring 43 and has annular end wall portion 62. Carried by end wall portion 62 of the cap is cam 64 which may consist of an inverted V of stiff paper or the like attached to the cap. The radial distance of cam 64 is such that the cam presses against movable plate 63 and forces the same outwardly, in this instance, to compress the capacitor against the inside surface of insulating ring 43.

By rotating cap 60 in the proper direction cam 64 will be moved along variable condenser plate 53 to force the same toward opposing plate 54 and thus increase the value of capacitance. By using a dielectric having a high constant, substantial capacitance between plates is provided when movable plate 53 is firmly against the dielectric.

For convenience when applying the cap to the yoke in aligning the cam and insulating ring 43, some indication, as marker 67, may be provided upon insulating ring 43 while an arrow 68 may be disposed upon the insulating cap. Thus in the position of cap shown in Figure 2, cam 64 will be disposed opposite anchor portion 52 of the plates and clear the variable condenser plate. Jamming of the condenser plate by the cam will be eliminated when putting the cap on. Terminals 46 and 47 extend inwardly far enough to act as stops for cam 64. Flange 61 of cap 60 is wide enough to cover the rivets or eyelets on ring 43. Thus flange 61 will insulate the high potential terminal fastening means.

Figure 4:
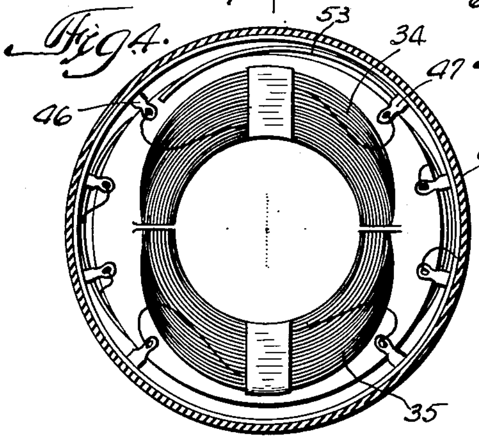
Figure 4 is a section along line 4—4 of Figure 3.
Figure 5:
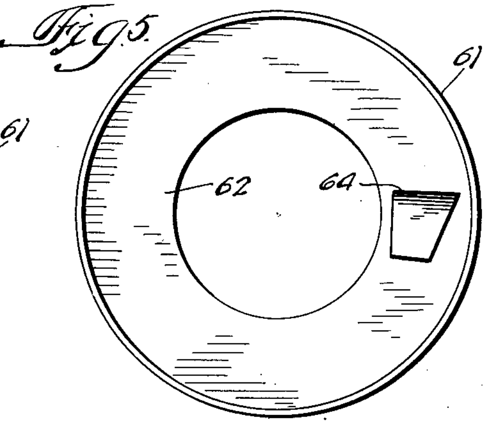
Figure 5 is a plan view of the inside of the cap for the end of the yoke, said cap carrying a cam for controlling the balancing capacitor.
Figure 6:
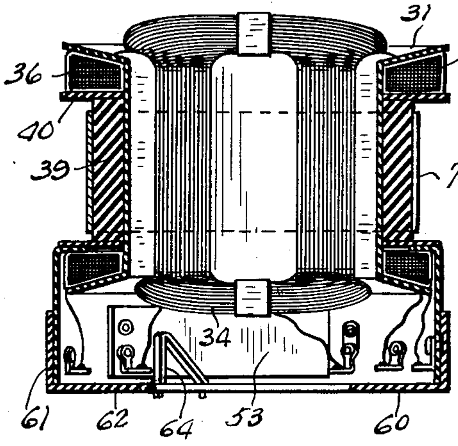
Figure 6 is a section along line 6—6 of Figure 3.
Figure 7:
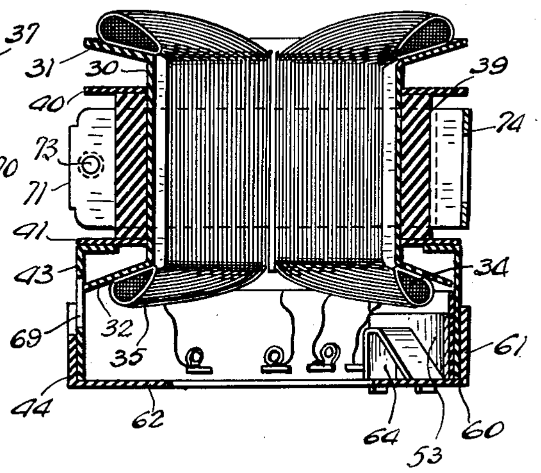
Figure 7 is a section along line 7—7 of Figure 2.

As is illustrated in Figure 4, the various terminals carried by insulating ring 43 have attached thereto the wires from the ends of the coils. Terminals 46 and 47 forming the terminals of the variable capacitor are preferably connected as shown in Figure 4 to the terminal of coil 34, which may correspond to coil 19 in Figure 1. However, any desired connections may be provided and the angular position of the variable capacitor with relation to the insulating ring may be selected for convenience and access to desired terminals.

The remaining terminals are generally numbered so that when the deflection yoke is applied to a cathode ray tube, the yoke may be connected for proper functioning. Insulating ring 43 has aperture 69 for entry of a cable to connect the yoke. After the yoke has been disposed on the cathode ray tube and properly connected, cap 60 which is normally positioned over insulating ring 43 may be turned to adjust the capacitance of variable condenser 60 to the desired value for proper operation. At any time in the future, should conditions require a rebalancing of the magnetic yoke, a simple turn of the cap will suffice. It may be desirable to lock the cap in adjusted position once the balance point has been obtained, and this may be done by applying some tape between the flange of the cap and the ring to prevent rotation. Cap 60 has the flange cut out at 66 to clear the cable.

The finished yoke is provided with metal collar 70 having bent ends 71 and 72 engaged by screw 73. Collar 70 is generally provided with channel portion 74 into which there may normally be disposed a nut for engaging a bolt upon a suitable bracket disposed in fixed relation to the cathode ray tube. Inasmuch as the mounting of the yoke, with respect to the cathode ray tube, is a matter well known in the art and is well within the skill of those versed in the art, and forms no part of the present invention, no detailed description thereof will be given.

While I have shown a variable capacitor controlled by rotation of an end cap, variations may be made, such as for example, having the variable capacitor extend axially of the yoke and having the cap adjust the capacitance by movement toward or away from the yoke. This latter construction, however, would involve a substantially longer structure without any particular advantage. It is also possible to have the variable capacitor outside of the flange on the insulating member. More than one variable capacitor may be provided and they may be angularly staggered or they may be both on the inside or outside of flange 43 or one capacitor may be inside and another capacitor may be on the outside of the flange. Also the flange may form the capacitor dielectric with one plate being on the one side and the other variable plate being on the other side.

Figure 11:
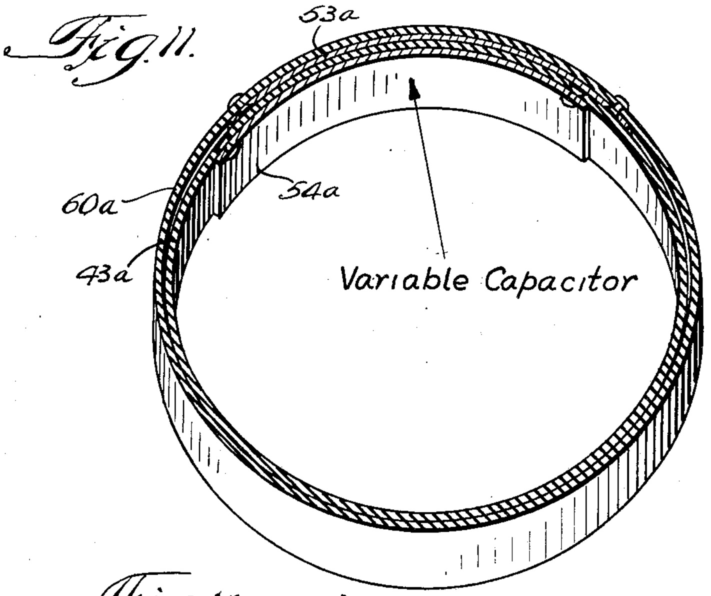
Figure 11 is a perspective view illustrating a modified structure.

Thus referring to Figure 11, a modification is illustrated where end cap **60*a* carries movable plate 53*a* of the variable capacitor while insulating ring 43*a* carries stationary plate 54*a*. The insulating ring functions as a dielectric, the capacitor plates being disposed respectively against the two sides of insulating ring 43*a*. It is understood that cap 60*a* will carry a terminal for plate 43*a* and will require a connection between the terminal and coil terminal. Rotation of cap 43*a*** will vary the capacitor. The thickness and nature of the insulation material forming the capacitor dielectric will be selected for proper capacitance variation.

Figures 12, 13:
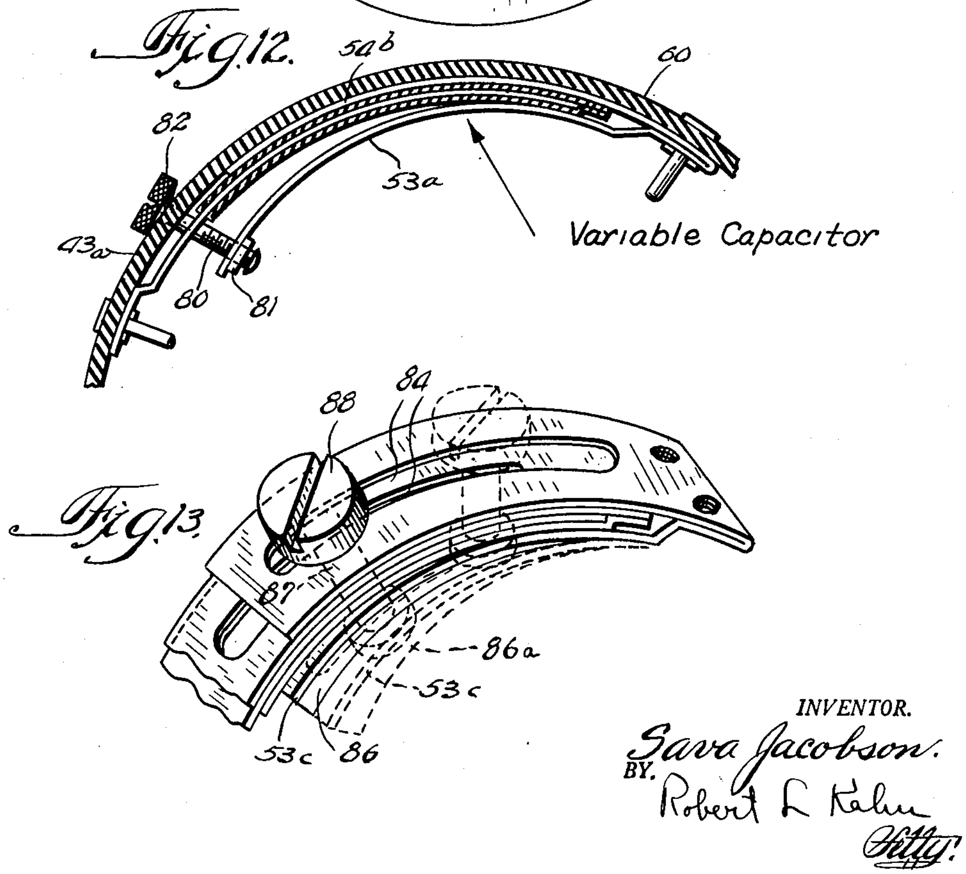
Figure 12 is a sectional detail illustrating a further modification.
Figure 13 is a perspective detail illustrating a still further modification.

In Figure 12, a screw adjustment is provided for varying the capacitor. Cap 60 is not used for capacitor adjustment. The capacitor construction in this modification is generally similar to that of Figures 9 and 10 except that insulating bolt 80 passes through apertures in ring **43*b*, stationary plate 54*b* and movable plate 53*b*. Insulating bolt 80 engages nut 81 attached to movable plate 53*b*. Head 72 on the bolt permits turning of the bolt to move plate 53*b* back and forth. Sufficient clearance is provided for bolt 80** so that it can move laterally with plate bending.

In Figure 13, a modified cam arrangement is provided. The capacitor is generally the same as in Figures 9 and 10 except that the capacitor plates and intervening dielectric are provided with slots 84 lengthwise of the capacitor elements. Movable plate 53c has attached thereto cam block 86. Insulating bolt 87 has head 88 outside of ring **53*c* and has nut 80*a* cooperating with cam block 86. The nut is locked on the bolt and the bolt may be moved along slots 84 to adjust the capacitor. The spring of movable plate 53*c*** away from the fixed plate will maintain the cam and bolt adjustment fixed.

What is claimed is:

1. A magnetic deflection yoke for a cathode ray tube comprising two pairs of deflecting windings for vertical and horizontal deflections respectively, means for maintaining the windings in predetermined shape and relative position so that the yoke is a unitary device which may be handled and positioned on a cathode ray tube, said yoke including an insulating member, condenser plates secured to said insulating member, means supported by said insulating member for adjusting said condenser plates to vary the capacitance thereof and connections between said plates and said windings whereby a self-contained magnetic deflection yoke and balancing condenser is provided.

2. A magnetic deflection yoke for a cathode ray tube comprising two pairs of deflecting windings for vertical and horizontal deflections respectively, means for maintaining the windings in predetermined shape and relative position so that the yoke is a unitary device which may be handled and positioned on a cathode ray tube, said yoke including an insulating member, condenser plates secured to said insulating member, one of said plates being flexible, means supported by said insulating member for bending one plate for adjusting the separation between said condenser plates to vary the capacitance thereof and connections between said plates and said windings whereby a self-contained magnetic deflection yoke and balancing condenser is provided.

3. A magnetic deflection yoke for a cathode ray tube comprising two pairs of deflecting windings for vertical and horizontal deflections respectively, means for maintaining the windings in predetermined shape and relative position so that the yoke is a unitary device which may be handled and positioned on a cathode ray tube, said yoke including an annular insulating member, curved condenser plates secured to said insulating member, means supported by said insulating member for bending one plate for adjusting the separation between said condenser plates to vary the capacitance thereof and connections between said plates and said windings whereby a self-contained magnetic deflection yoke and balancing condenser is provided.

4. A magnetic deflection yoke for a cathode ray tube comprising two pairs of deflecting windings for vertical and horizontal deflections respectively, means for maintaining said windings in predetermined shape and relative position so that the yoke is a unitary device which may be handled and positioned on a cathode ray tube, said yoke including an annular insulating member at one end of said yoke and extending beyond said windings, curved condenser plates carried by said annular member upon the inside surface thereof, connections between said plates and a winding, an insulator cap for the free end of said insulating member and means carried by said cap for controlling the separation between said plates to vary the capacitance.

5. A magnetic deflection yoke for a cathode ray tube comprising two pairs of deflecting windings for vertical and horizontal deflections respectively, means for maintaining said windings in predetermined shape and relative position so that the yoke is a unitary device which may be handled and positioned on a cathode ray tube, said yoke including an annular insulating member at one end thereof extending beyond said windings, curved condenser plates secured to said insulating member upon the inside thereof, said plates subtending an angle along said annular insulating member, one plate being movable and forming the innermost plate and having one end free so that said movable plate may have the free end thereof travel radially in or out from the inside of said annular member to increase or decrease capacitance, connections between said plates and a winding, an insulating cap disposed over the end of said annular insulating member, said cap being rotatable with respect to said insulating member and a cam carried by said cap upon the inside for cooperation with said movable plate to control the position of said movable plate with respect to the stationary plate, said cam being movable along a surface of said movable plate to vary capacitance.

6. The structure according to claim 5 wherein said cam is disposed inwardly of the movable plate so that said cam bears against the free surface of said movable plate to force said movable plate toward the stationary plate.

7. The construction according to claim 5 wherein the means for attaching the plates to said annular insulating member also carry terminal lugs extending inwardly of said insulating member, said lugs functioning as stops for the cam to limit cap rotation.

8. A magnetic deflection yoke for a cathode ray tube comprising two pairs of deflecting windings for vertical and horizontal deflections respectively, means for maintaining said windings in predetermined shape and relative position so that the yoke is a unitary device which may be handled and positioned on a cathode ray tube, said yoke including an annular insulating member, said member extending beyond the yoke windings at one end of said yoke, condenser plates secured to said insulating member along the inside surface thereof, said plates being curved to fit the curvature of said annular member, one of said plates being attached at one end only and being free to bend inwardly toward the yoke axis, said attaching means for said plate also carrying inwardly extending lugs for making connections, connections between said plates and the terminals of a horizontal winding, a rotatable cap on the free end of said annular member, a cam carried by said cap upon the inside thereof for engaging said one movable plate, said movable plate being preshaped so that normally the unsupported part of said plate curves away from the insulating member toward the yoke axis, said cam being so positioned that it engages the exposed base of the movable plate and with rotation of the cap tends to force said movable plate outwardly against the remaining plates to increase capacitance, said terminal lugs at the plate fastening means functioning to limit cam travel.

9. The structure according to claim 3 wherein the means for bending one plate includes a bolt carried by said insulating member and a nut bearing against the curved plate cooperating with said bolt.

10. The structure according to claim 3 where the means for bending one plate includes a cam block carried by said one plate, the condenser plates being longitudinally slotted, and a pin extending through the condenser plates and slidable along the slot.

References Cited in the file of this patent

UNITED STATES PATENTS

| Number | Name | Date |
|---|---|---|
| 2,234,720 | De Tar | Mar. 11, 1941 |
| 2,428,947 | Torsch | Oct. 14, 1947 |
| 2,563,116 | Hultgren | Aug. 7, 1951 |